(12) United States Patent
Discekici et al.

(10) Patent No.: US 12,528,958 B2
(45) Date of Patent: Jan. 20, 2026

(54) THREE-DIMENSIONAL PRINTING WITH THERMOPLASTIC ELASTOMERIC PARTICLES AND LOWER ALKYLDIOL ORGANIC CO-SOLVENTS

(71) Applicant: PERIDOT PRINT LLC, Palo Alto, CA (US)

(72) Inventors: Emre Hiro Discekici, San Diego, CA (US); Qin Liu, Corvallis, OR (US); Tienteh Chen, San Diego, CA (US); Shannon Reuben Woodruff, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 114 days.

(21) Appl. No.: 17/908,713

(22) PCT Filed: Mar. 31, 2020

(86) PCT No.: PCT/US2020/025874
§ 371 (c)(1),
(2) Date: Sep. 1, 2022

(87) PCT Pub. No.: WO2021/201834
PCT Pub. Date: Oct. 7, 2021

(65) Prior Publication Data
US 2023/0159776 A1 May 25, 2023

(51) Int. Cl.
*B29C 64/264* (2017.01)
*B29C 64/165* (2017.01)
(Continued)

(52) U.S. Cl.
CPC .......... *C09D 11/324* (2013.01); *B29C 64/165* (2017.08); *B33Y 10/00* (2014.12);
(Continued)

(58) Field of Classification Search
CPC ... B29C 64/165; B29C 64/264; B29C 64/268; B29C 64/273; B29C 71/04;
(Continued)

(56) References Cited

U.S. PATENT DOCUMENTS 10,232,533 B2  3/2019  Baghdadi
2014/0121327 A1 * 5/2014  Schmidt ................. B33Y 70/00
                                               264/497

(Continued)

FOREIGN PATENT DOCUMENTS

CN         108698314 A     10/2018
WO       WO-9841385 A1 *  9/1998  ............. B33Y 70/00
(Continued)

*Primary Examiner* — Leo B Tentoni
(74) *Attorney, Agent, or Firm* — Dierker & Kavanaugh, P.C.

(57) ABSTRACT

A three-dimensional printing kit can include a polymeric build material including thermoplastic elastomeric particles having a D50 particle size from about 2 μm to about 150 μm, and a fusing agent. The fusing agent can include water, from about 5 wt % to about 40 wt % lower alkyldiol organic co-solvent, and a radiation absorber to generate heat from absorbed electromagnetic radiation.

18 Claims, 2 Drawing Sheets

(51) Int. Cl.

| | |
|---|---|
| B29C 64/268 | (2017.01) |
| B29C 64/273 | (2017.01) |
| B33Y 10/00 | (2015.01) |
| B33Y 30/00 | (2015.01) |
| B33Y 70/00 | (2020.01) |
| B41J 2/04 | (2006.01) |
| B41J 2/06 | (2006.01) |
| B41J 2/14 | (2006.01) |
| B41J 2/175 | (2006.01) |
| B41J 11/00 | (2006.01) |
| C09D 11/033 | (2014.01) |
| C09D 11/037 | (2014.01) |
| C09D 11/102 | (2014.01) |
| C09D 11/324 | (2014.01) |
| B29K 21/00 | (2006.01) |
| B29K 105/00 | (2006.01) |

(52) U.S. Cl.
CPC ............... *B33Y 30/00* (2014.12); *B33Y 70/00* (2014.12); *B41J 2/14016* (2013.01); *B41J 2/14201* (2013.01); *B41J 11/0021* (2021.01); *B41J 11/00214* (2021.01); *B41J 11/00216* (2021.01); *C09D 11/033* (2013.01); *C09D 11/037* (2013.01); *C09D 11/102* (2013.01); *B29K 2021/003* (2013.01); *B29K 2105/005* (2013.01); *B29K 2105/251* (2013.01)

(58) Field of Classification Search
CPC ........ B29K 2021/003; B29K 2105/251; B33Y 10/00; B33Y 30/00; B33Y 70/00; B41J 2/04; B41J 2/06; B41J 2/14016; B41J 2/14201; B41J 2/175; B41J 11/0021; B41J 11/00214; B41J 11/00216
USPC ........ 264/113, 460, 462, 463, 494; 425/174, 425/174.4; 347/54, 56, 66, 68, 102
See application file for complete search history.

(56) References Cited

U.S. PATENT DOCUMENTS

| | | |
|---|---|---|
| 2015/0064382 A1 | 3/2015 | Peters |
| 2017/0282456 A1* | 10/2017 | Wright .................. B33Y 30/00 |
| 2019/0037969 A1 | 2/2019 | Busbee et al. |
| 2019/0119471 A1 | 4/2019 | Chino et al. |
| 2021/0214570 A1 | 7/2021 | Prasad et al. |

FOREIGN PATENT DOCUMENTS

| | | | |
|---|---|---|---|
| WO | WO-2017188965 A1 * | 11/2017 | ........... B29C 64/165 |
| WO | 2019/083387 A1 | 5/2019 | |
| WO | 2019/221733 A1 | 11/2019 | |

* cited by examiner

THREE-DIMENSIONAL PRINTING WITH THERMOPLASTIC ELASTOMERIC PARTICLES AND LOWER ALKYLDIOL ORGANIC CO-SOLVENTS

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some three-dimensional printing techniques can be considered additive processes because they involve the application of successive layers of material. This can be unlike other machining processes, which often rely upon the removal of material to create the final part.

DETAILED DESCRIPTION

Figure 1:
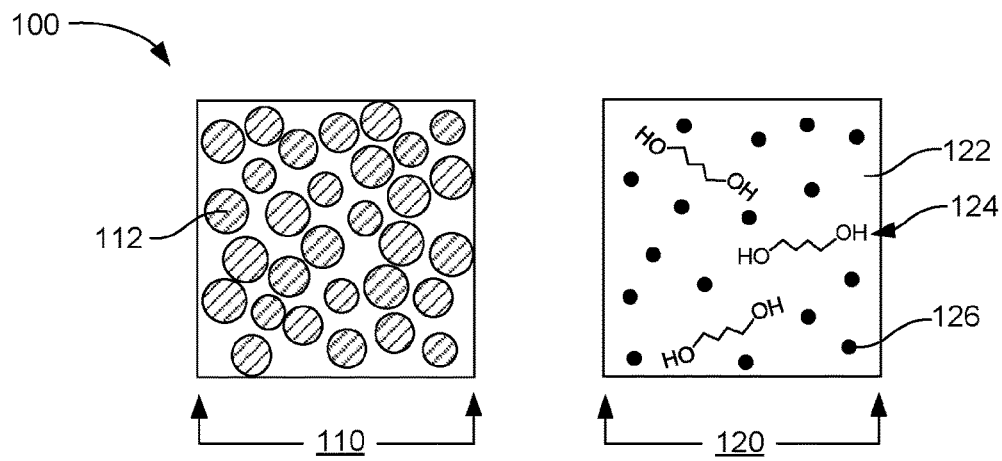
FIG. 1 is a schematic illustration of an example three-dimensional printing kit in accordance with the present disclosure.

Three-dimensional printing can be an additive process involving the application of successive layers of a polymeric build material with a fusing agent printed thereon to cause successive layers of the polymeric build material to become bound together. For example, the fusing agent can be selectively applied to a layer of a polymeric build material on a support bed, e.g., a build platform supporting polymeric build material, to pattern a selected region of a layer of the polymeric build material. The layer of the polymeric build material (which includes the thermoplastic elastomeric particles) can be exposed to electromagnetic radiation, and due to the presence of the radiation absorber on the printed portions, absorbed light energy at those portions of the layer having the fusing agent printed thereon can be converted to thermal energy, causing that portion to melt or coalesce, while other portions of the polymeric build material do not reach temperatures suitable to melt or coalesce. This can then be repeated on a layer-by-layer basis until the three-dimensional object is formed. More specifically, a polymeric build material including thermoplastic elastomeric particles can be paired with a fusing agent that includes a lower alkyldiol as a humectant and plasticizing agent to provide modified mechanical properties, such as enhanced elasticity and/or reduced hardness, as they interact with the polyol soft segments of many elastomeric polymers.

In accordance with this, a three-dimensional printing kit (or "kit") can include a polymeric build material including from about 80 wt % to 100 wt % thermoplastic elastomeric particles and a fusing agent. The thermoplastic elastomeric particles can have a D50 particle size from about 2 μm to about 150 μm. The fusing agent can include water, from about 5 wt % to about 40 wt % lower alkyldiol organic co-solvent, and a radiation absorber to generate heat from absorbed electromagnetic radiation. In one example, the lower alkyldiol organic co-solvent can be a C2 to C8 alkyldiol with two hydroxyl groups. In another example, the lower alkyldiol organic co-solvent can be a C4 to C6 straight-chained alkyldiol with two terminal hydroxyl groups. The thermoplastic elastomeric particles, for example, can be in the form of a block copolymer with a polyol soft-segment block. The thermoplastic elastomeric particles, for example, can include thermoplastic elastomeric polyamide particles, thermoplastic elastomeric polyurethane particles, thermoplastic elastomeric polyester particles, copolymers thereof, or mixtures thereof. The radiation absorber can be present in the fusing agent at from about 0.1 wt % to about 10 wt %, and can include carbon black, a metal dithiolene complex, a near-infrared absorbing dye, a near-infrared absorbing pigment, metal nanoparticles, a conjugated polymer, or a combination thereof. The fusing agent can be devoid of lactam organic co-solvents. In another example, the three-dimensional printing kit can further include a detailing agent. The detailing agent can include a detailing compound to reduce a temperature of the polymeric build material onto which the detailing agent is applied.

In another example, a method of printing a three-dimensional object (or "method") can include iteratively applying individual polymeric build material layers including from about 80 wt % to 100 wt % thermoplastic elastomeric particles having a D50 particle size from about 2 μm to about 150 μm, and based on a three-dimensional object model, iteratively and selectively dispensing a fusing agent onto individual build material layers. The fusing agent can include water, from about 5 wt % to about 40 wt % lower alkyldiol organic co-solvent, and a radiation absorber to generate heat from absorbed electromagnetic radiation. The method can further include iteratively exposing the individual polymeric build material layers with the fusing agent dispensed therewith to electromagnetic radiation to selectively fuse thermoplastic elastomeric particles of the polymeric build material in contact with the radiation absorber and to form a fused three-dimensional object. In one example, the lower alkyldiol organic co-solvent can be a C2 to C8 alkyldiol with two hydroxyl groups. The thermoplastic elastomeric particles can include block copolymers with a polyol soft-segment block. In another example, the lower alkyldiol organic co-solvent can be applied to individual build material layers at a lower alkyldiol organic co-solvent to polymeric build material weight ratio from about 1:180 to about 2:45. In another example, the method can also include selectively jetting a detailing agent comprising a detailing compound onto the individual build material layers. The detailing compound can reduce the temperature of build material onto which the detailing agent is applied.

In another example, a three-dimensional printing system can include a polymeric build material and a fluid applicator fluidly coupled or coupleable to a fusing agent. The polymeric build material can include from about 80 wt % to 100 wt % thermoplastic elastomeric particles having a D50 particle size from about 2 μm to about 150 μm. The fluid applicator can be directable to iteratively apply the fusing agent to layers of the polymeric build material. The fusing agent can include water, a lower alkyldiol organic co-solvent, and a radiation absorber to generate heat from absorbed electromagnetic radiation. In one example, the system can further include an electromagnetic radiation source positioned to provide electromagnetic radiation to the layers of the polymeric build material having the fusing agent applied thereto. The lower alkyldiol organic co-solvent can be a C2 to C8 alkyldiol with two hydroxyl groups.

The thermoplastic elastomeric particles can include block copolymers with a polyol soft-segment block.

When discussing the three-dimensional printing kit, method of printing a three-dimensional object, and/or the three-dimensional printing system herein, these discussions can be considered applicable to one another whether or not they are explicitly discussed in the context of that example. Thus, for example, when discussing a polymeric build material related to a three-dimensional printing kit, such disclosure is also relevant to and directly supported in the context of the method of printing a three-dimensional object, the three-dimensional printing system, and vice versa.

Terms used herein will have the ordinary meaning in their technical field unless specified otherwise. In some instances, there are terms defined more specifically throughout the specification or included at the end of the present specification, and thus, these terms can have a meaning as described herein.

Three-Dimensional Printing Kits

A three-dimensional printing kit 100 is shown by way of example in FIG. 1. The three-dimensional printing kit can include, for example, a polymeric build material 110 and a fusing agent 120. The polymeric build material can include from about 80 wt % to 100 wt % thermoplastic elastomeric particles 112 and can have a D50 particle size from about 2 μm to about 150 μm, for example. The thermoplastic elastomeric particles, for example, can be in the form of a block copolymer with a polyol soft-segment block. The thermoplastic elastomeric particles, for example, can include thermoplastic elastomeric polyamide particles, thermoplastic elastomeric polyurethane particles, thermoplastic elastomeric polyester particles, copolymers thereof, or mixtures thereof. The fusing agent can include, for example, water 122, from about 5 wt % to about 40 wt % lower alkyldiol organic co-solvent 124, and a radiation absorber 126 to generate heat from absorbed electromagnetic radiation. In some specific examples, the lower alkyldiol organic co-solvent can be a C2 to C8 alkyldiol, e.g., C2-C8 straight-chained alkyldiol, C3-C8 branched alkyldiol, C6-C8 alicyclic diol, or a combination thereof. In another example, lower alkyldiol organic co-solvent can be a C4 to C6 straight-chained alkyldiol with two terminal hydroxyl groups. In the specific example shown in FIG. 1, the lower alkyldiol is shown as a 1,5-pentanediol. In some other examples, the fusing agent can be devoid of lactam organic co-solvents. The radiation absorber can be present in the fusing agent at from about 0.1 wt % to about 10 wt %, and can include carbon black, a metal dithiolene complex, a near-infrared absorbing dye, a near-infrared absorbing pigment, metal nanoparticles, a conjugated polymer, or a combination thereof.

In some examples, the three-dimensional printing kit can further include other fluids, such as coloring agents, detailing agents, or the like. A detailing agent, for example, can include a detailing compound, which can be a compound that can reduce the temperature of the polymeric build material when applied thereto. In some examples, the detailing agent can be applied around edges of the application area of the fusing agent. This can prevent caking around the edges due to heat from the area where the fusing agent was applied. The detailing agent can also be applied in the same area where the fusing agent was applied in order to control the temperature and prevent excessively high temperatures when the polymeric build material is fused. In further detail, the polymeric build material may be packaged or co-packaged with the fusing agent, and if included, a coloring agent, a detailing agent, or the like in separate containers, and/or can be combined with the fusing agent at the time of printing, e.g., loaded together in a three-dimensional printing system.

Methods of Printing Three-Dimensional Objects

Figure 2:
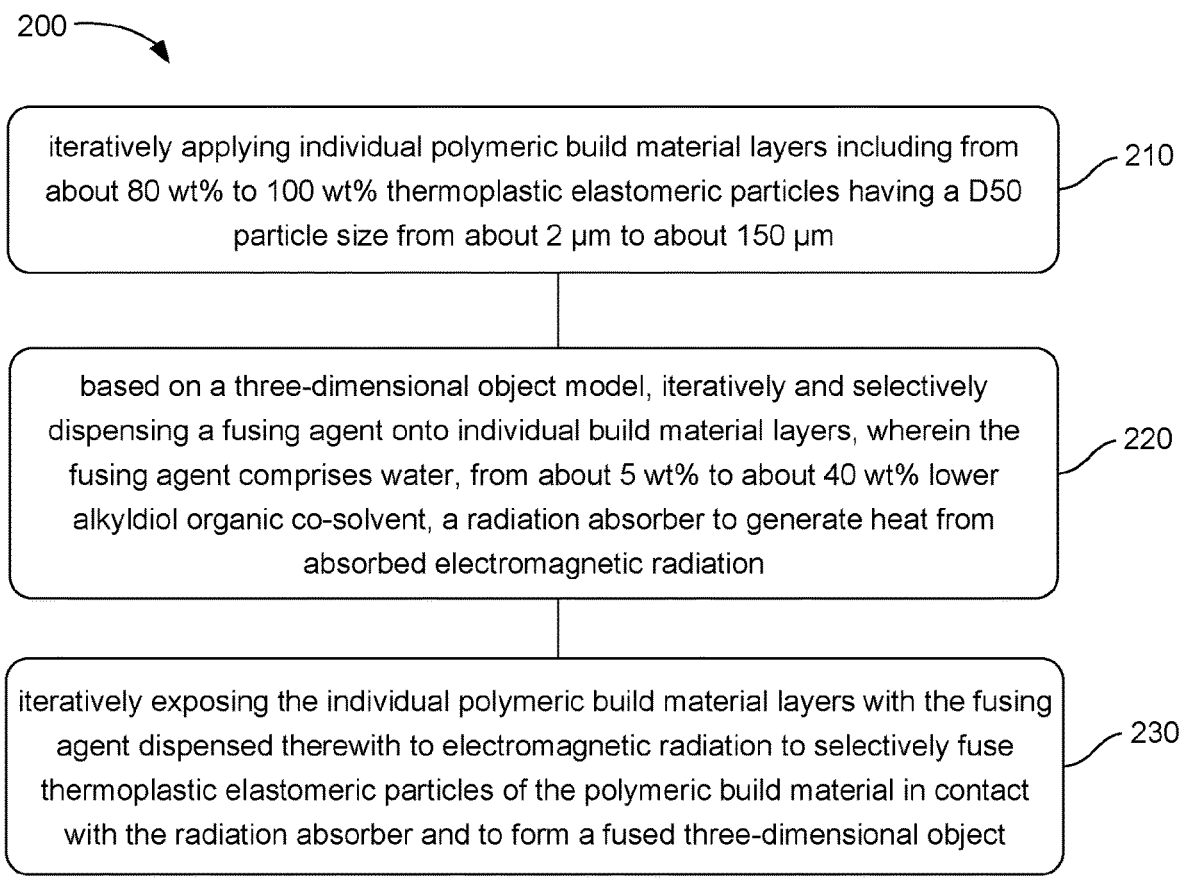
FIG. 2 is a flow diagram illustrating an example method of printing a three-dimensional object in accordance with the present disclosure.

A flow diagram of an example method 200 of three-dimensional (3D) printing is shown in FIG. 2. The method can include iteratively applying 210 individual polymeric build material layers including from about 80 wt % to 100 wt % thermoplastic elastomeric particles having a D50 particle size from about 2 μm to about 150 μm, and based on a three-dimensional object model, iteratively and selectively dispensing 220 a fusing agent onto individual build material layers. The fusing agent can include water, from about 5 wt % to about 40 wt % lower alkyldiol organic co-solvent, and a radiation absorber to generate heat from absorbed electromagnetic radiation. The method can further include iteratively exposing 230 the individual polymeric build material layers with the fusing agent dispensed therewith to electromagnetic radiation to selectively fuse thermoplastic elastomeric particles of the polymeric build material in contact with the radiation absorber and to form a fused three-dimensional object. The compositional components used in this method can be similar to those described herein with respect to the three-dimensional printing kits and three-dimensional printing systems described herein.

In printing in a layer-by-layer manner, the polymeric build material can be spread, the fusing agent applied, the layer of the polymeric build material can be exposed to energy, and then a build platform between the polymeric bed material and the fusing agent application can be adjusted to accommodate the printing of another layer, e.g., about 5 μm to about 1 mm, which can correspond to the thickness of a printed layer of the three-dimensional object. Thus, another layer of the polymeric build material can be added again thereon to receive another application of fusing agent, and so forth. During the build, the radiation absorber in the fusing agent can act to convert the energy to thermal energy and promote the transfer of thermal heat to thermoplastic elastomeric particles of the polymeric build material in contact with the fusing agent including the radiation absorber. In an example, the fusing agent can elevate the temperature of the thermoplastic elastomeric particles of the polymeric build material above the melting or softening point of the thermoplastic elastomeric particles, thereby allowing fusing (e.g., sintering, binding, curing, etc.) of the polymeric build material (or thermoplastic elastomeric particles thereof) and the formation of an individual layer of the three-dimensional object. The method can be repeated until all the individual polymeric build material layers have been created and a three-dimensional object is formed. In some examples, the method can further include heating the polymeric build material prior to dispensing.

In one example, the method can further include, iteratively and selectively dispensing a detailing agent onto individual polymeric build material layers laterally at a border between a first area where the individual polymeric build material layer was contacted by the fusing agent and a second area where the individual polymeric build material layer was not contacted by the fusing agent. As mentioned, a detailing agent can include a detailing compound to reduce a temperature of the polymeric build material onto which the detailing agent is applied. In one example, this can be used to prevent caking around the edges due to heat from the area where the fusing agent was applied. The detailing agent can also be applied in the same area where the fusing agent was applied in order to control the temperature and prevent excessively high temperatures when the polymeric build material is fused.

In another example, the three-dimensional object formed from the method can be softened (compared to three-dimensional objects printed with the same fusing agent, but without the polymer-softening fusing compound), or can be adjusted with respect to tensile strength, for example. Specifically, three-dimensional objects can be subject to tensile strength and elongation at break issues which can result in failure due to brittleness. The use of the fusing agents described herein can provide a way of reducing the hardness of the three-dimensional object, and in some cases, increase the tensile strength and/or elasticity, as well, particularly with different types of thermoplastic elastomeric polymer build materials, e.g., thermoplastic elastomeric polyamide particles, thermoplastic elastomeric polyurethane particles, thermoplastic elastomeric polyester particles, copolymers thereof, mixtures thereof, etc.

In some examples, a three-dimensional printed object produced using the kits, methods, and systems described herein can have enhanced elasticity compared, with a percent (%) strain (or elongation) at breaks greater than about 200%, e.g., from about 200% to about 500%, from about 200% to about 400%, from about 250% to about 400%, etc., as measured using a standard procedure as described in ASTM D638 ASTM and as described more fully in Example 3 herein.

Three-Dimensional Printing Systems

Figure 3:
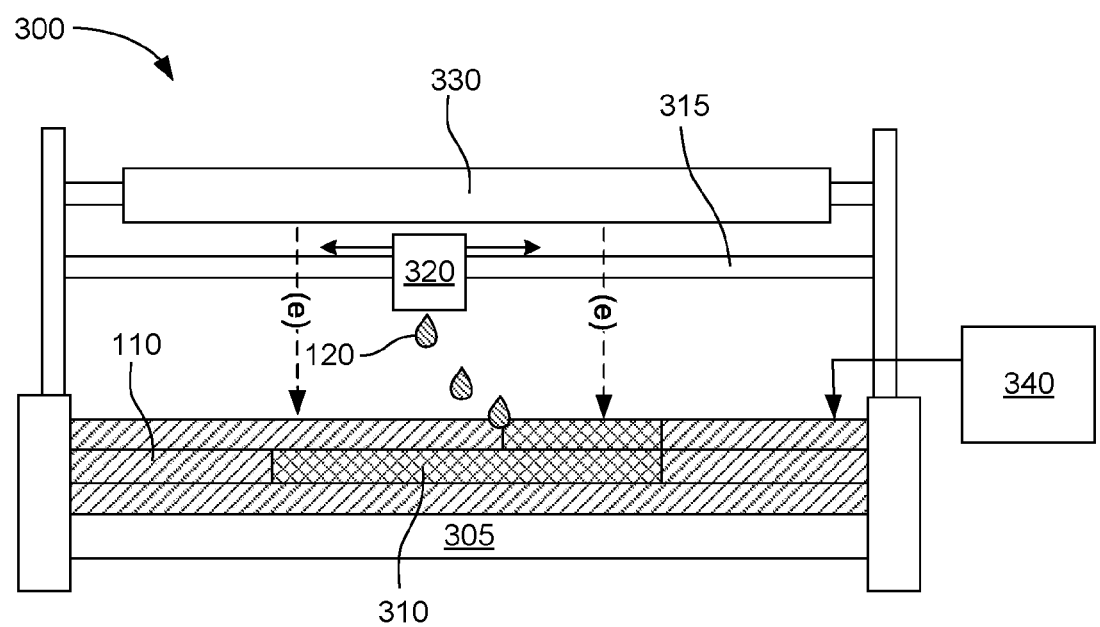
FIG. 3 is a schematic illustration of an example three-dimensional printing system in accordance with the present disclosure.

A three-dimensional printing system 300 in accordance with the present disclosure is illustrated schematically in FIG. 3. The three-dimensional printing system can include a polymeric build material 110 and a fluid applicator 320. The polymeric build material can include from about 80 wt % to 100 wt % thermoplastic elastomeric particles that have a D50 particle size of from about 2 μm to about 150 μm and can be any of a number of polymeric build materials, such as those previously described with respect to the three-dimensional printing kits shown in FIG. 1. The fluid applicator can be coupled or coupleable to a fusing agent 120. The fusing agent can include, for example, water, from about 5 wt % to about 40 wt % lower alkyldiol organic co-solvent, and a radiation absorber to generate heat from absorbed electromagnetic radiation, as shown and described with respect to the three-dimensional printing kits, also in FIG. 1.

In further detail, the fluid applicator 320 can be a digital fluid ejector, e.g., thermal or piezo jetting architecture. The fluid applicator, in an example, can be a fusing agent applicator that can be fluidly coupled or coupleable to the fusing agent 120 to iteratively apply the fusing agent to the polymeric build material 110 to form individually patterned object layers 310. The fluid applicator can be any type of apparatus capable of selectively dispensing or applying the fusing agent. For example, the fluid applicator can be a fluid ejector or digital fluid ejector, such as an inkjet printhead, e.g., a piezoelectric printhead, a thermal printhead, a continuous printhead, etc. The fluid applicator could likewise be a sprayer, a dropper, or other similar structure for applying the fusing agent to the polymeric build material. Thus, in some examples, the application can be by jetting or ejecting the fusing agent from a digital fluid jet applicator, similar to an inkjet pen.

In an example, the fluid applicator can be located on a carriage track 315, as shown in FIG. 3, but could be supported by any of a number of structures. In yet another example, the fluid applicator can include a motor (not shown) and can be operable to move back and forth, and the fluid applicator can also be moved front to back as well, to provide both x- and y-axis movement over the polymeric build material when positioned over or adjacent to a polymeric build material on a powder bed of a build platform.

In an example, the three-dimensional printing system can further include a build platform 305 to support the polymeric build material. The polymeric build material 110 can be spread onto the build platform or a previously applied powder bed of polymeric build material from a build material supply 340, and then in some instances flattened to make the applied layer more uniform in nature. The build platform can be positioned to permit application of the fusing agent from the fluid applicator onto a layer of the polymeric build material. The build platform can be configured to drop in height, thus allowing for successive layers of the polymeric build material to be applied by a supply and/or spreader. The polymeric build material can be layered in the build platform at a thickness that can range from about 5 μm to about 1 mm. In some examples, individual layers can have a relatively uniform thickness. In one example, a thickness of a layer of the polymeric build material can range from about 10 μm to about 500 μm or from about 30 μm to about 200 μm. Furthermore, heat can be applied to the build platform, or from any other direction or time, to bring the polymeric build material to a temperature near its fusing temperature, making it easier to bring up the temperature enough to generate fusion of the polymeric build material. For example, heat may be applied to the polymeric build material in the powder bed from the build platform, from above, or to the polymeric build material prior to being spread on the powder bed to preheat the polymeric build material within about 10° C. to about 70° C. of the fusing temperature of the thermoplastic elastomeric particles so that less energy may be applied to bring the thermoplastic elastomeric particles to their fusing temperature.

Following the selective application of a fusing agent to the polymeric build material, the polymeric build material can be exposed to energy (e) from an electromagnetic radiation source 330. The electromagnetic radiation source can be positioned to expose the individual layers of the polymeric build material to radiation energy to selectively fuse thermoplastic elastomeric particles of the polymeric build material in contact with the radiation absorber (forming fused layers 310) to iteratively form a three-dimensional object. The radiation source can be an infrared (IR) or near-infrared light source, such as IR or near-IR curing lamps, IR or near-IR light emitting diodes (LED), or lasers with the desirable IR or near-IR electromagnetic wavelengths, and can emit electromagnetic radiation having a wavelength ranging from about 400 nm to about 1 mm. In one example, the emitted electromagnetic radiation can have a wavelength that can range from about 400 nm to about 2 μm. In some examples, the radiation source can be operatively connected to a lamp/laser driver, an input/output temperature controller, and/or temperature sensors.

Polymeric Build Materials

The polymeric build material can be used as the bulk material of the three-dimensional printed object. As mentioned, the polymeric build material can include from about 80 wt % to 100 wt % thermoplastic elastomeric particles. In another example, the polymeric build material can include from about 85 wt % to about 95 wt %, from about 90 wt % to 100 wt %, or 100 wt % thermoplastic elastomeric particles. Thermoplastic elastomers often include hard segments and soft segments, and the ratio of hard segments and soft segments can be varied to adjust water-resistivity, mechanical properties such as elasticity, and/or other properties, for example.

There are several classes of thermoplastic elastomeric particles that can be selected for use, including styrenic block copolymers (TPS), thermoplastic polyolefin elastomers (TPO), thermoplastic vulcanizates (TPV), thermoplastic polyurethane elastomers (TPU), thermoplastic polyester elastomer (TPC), and/or thermoplastic polyamides (TPA). In some examples, however, the thermoplastic elastomeric particles selected for use can be thermoplastic elastomeric polyamide particles (TPA), thermoplastic elastomeric polyurethane particles (TPU), thermoplastic elastomeric polyester particles (TPC), copolymers thereof, or mixtures thereof.

Thermoplastic elastomeric polyamides (TPA) may sometimes be referred to as thermoplastic elastomeric polyether-polyamides (TPE-A). In further detail, thermoplastic elastomeric polyamides may also include polyamide-imides prepared from isocyanates and TMA (trimellic acid-anhydride) in N-methyl-2-pyrrolidone (NMP). A prominent distributor of polyamide-imides is Solvay Specialty Polymers. Thermoplastic elastomeric polyamides (or polyether-polyamide) can be in the form of polyimide-based block copolymers, and may include no plasticizer therein in its formulation. Even without added plasticizer in the powder formulation, these materials can still have good flexible properties. Even so, when using this type of material to form three-dimensional objects as described herein, the presence of the lower alkyldiol organic co-solvent in the fusing agent can further enhance the elasticity, softness, etc., compared to three-dimensional objects prepared without this particular organic co-solvent.

Thermoplastic elastomeric polyurethane (TPU) typically includes alternating high-melting (hard) urethane segments and more liquid-like (soft) polyol segments. Hard segments may be a reaction product of aromatic or aliphatic diisocyanates and low molecular weight diols as chain extenders. Longer polyol chains may be present as the soft segments, including those that may be built from polyethers, polycarbonates, or the like. A terminal hydroxyl group can be used, for example, to connect to the hard segments. The polyols of the soft segments can be particularly interactive with the hydroxyl groups of the lower alkyldiol organic co-solvent present in the fusing agents described herein, thus providing a plasticizing effect relative to the thermoplastic elastomeric polyurethane particles.

Thermoplastic elastomeric polyester particles (TPC) may sometimes be referred to as copolyester-based block copolymers (TPE-E). Thermoplastic elastomeric polyesters can provide more frequent flexibility than other thermoplastic elastomers, in some examples. Furthermore, these materials can be particularly recyclable since they can be molded, extruded, and reused. They can also be ground up and recycled for further use. In the context of three-dimensional printing, these types of thermoplastatic elastomers could be selected for use when there is a desire or reason to form a high performance and/or high stress three-dimensional object, for example.

The various thermoplastic elastomeric polymeric particles described herein can be prepared for use having any of a variety of structures, including a variety of weight average molecular weights, D50 particle sizes, polydispersity of side-chain branching, etc. In one example, the polymeric build material may include similarly sized thermoplastic elastomeric particles or differently sized thermoplastic elastomeric particles. The term "size" or "particle size," as used herein, refers to the diameter of a substantially spherical particle, or the effective diameter of a non-spherical particle, e.g., the diameter of a sphere with the same mass and density as the non-spherical particle as determined by weight. A substantially spherical particle, e.g., spherical or near-spherical, can have a sphericity of >0.84. Thus, any individual thermoplastic elastomeric particles having a sphericity of <0.84 can be considered non-spherical (irregularly shaped). For example, the thermoplastic elastomeric particles can have a D50 particle size from about 2 µm to about 150 µm, from about 25 µm to about 125 µm, from about 50 µm to about 150 µm, or from about 20 µm to about 80 µm. D50 particle sizes are based on the equivalent spherical volume of the thermoplastic elastomeric particles. D50 particle sizes can be measured by laser diffraction, microscope imaging, or other suitable methodology, but in some examples, the particle size (or particle size distribution) can be measured and/or characterized using a Malvern™ Mastersizer™ This tool considers particle sizes based on diameter of the equivalent spherical volume of the thermoplastic elastomeric particles when the thermoplastic elastomeric particles are not spherical, e.g., having about a 1:1 aspect ratio.

The polymeric build material can, in some examples, further include flow additives, antioxidants, inorganic filler, or any combination thereof. Typically, an amount of any of these or other similar components can be at about 5 wt % or less. Example flow additives can include fumed silica, and/or the like. Example antioxidants can include hindered phenols, phosphites, thioethers, hindered amines, and/or the like. Example inorganic fillers can include particles such as alumina, silica, glass beads, glass fibers, carbon nanotubes, cellulose, and/or the like. Some additives may be found in multiple categories of additives, e.g., fumed silica can be a flow additive as well as a filler. In some examples, the filler or other type of additive can become embedded or composited with the thermoplastic elastomeric particles.

The polymeric build material can be capable of being printed into three-dimensional objects with a resolution of about 10 µm to about 150 µm, about 20 µm to about 100 µm, or about 25 µm to about 80 µm. As used herein, "resolution" refers to the size of the smallest feature that can be formed on a three-dimensional object. The polymeric build material can form layers from about 10 µm to about 150 µm thick, depending on the size of thermoplastic elastomeric particles present in the polymeric build material, thus allowing the fused layers of the printed object to have about the same thickness or a few to many times (e.g., 2 to 20 times) thicker than the D50 particle size of the thermoplastic elastomeric particles, for example. This can provide a resolution in the z-axis direction (e.g., the direction of the buildup of layers) of about 10 µm to about 150 µm. In some examples, however, the polymeric build material can also have a sufficiently small particle size and sufficiently uniform particle shape to provide an x- and y-axis resolution about the size of the polymer particle size, e.g., about 2 µm to about 150 µm (e.g., the axes parallel to the support surface of the build platform).

Fusing Agents

In further detail, regarding the fusing agent that may be utilized in the three-dimensional printing kits, methods of printing a three-dimensional object, or the three-dimensional printing systems, as described herein, such fusing agents can include, for example, water, from about 5 wt % to about 40 wt % lower alkyldiol organic co-solvent, and a radiation absorber to generate heat from absorbed electromagnetic radiation. It is noted that the term "lower alkyldiol" refers to compounds with "alkyl" moieties including from C3 to C10 branched alkyl chains, C1 to 010 straight alkyl chains, C6 to C12 alicyclic groups, or a combination of alkyl chains and alicyclic groups; and "diol" refers to compounds including two or more hydroxyl groups, e.g., two hydroxyl groups, three hydroxyl groups, or four hydroxyl groups. As mentioned, in one specific example, the lower alkyldiol organic co-solvent can be a C2 to C8 alkyldiol, e.g., C2-C8 straight-chained alkyldiol, C3-C8 branched alkyldiol, C6-C8 alicyclic diol, or a combination thereof. In another example, lower alkyldiol organic co-solvent can be a C4 to C6 straight-chained alkyldiol with two terminal hydroxyl groups. The fusing agent can be devoid of lactam organic co-solvents. The radiation absorber can be present in the fusing agent at from about 0.1 wt % to about 10 wt %, and can include carbon black, a metal dithiolene complex, a near-infrared absorbing dye, a near-infrared absorbing pigment, metal nanoparticles, a conjugated polymer, or a combination thereof.

In further detail, the fusing agent can include a radiation absorber. An amount of radiation absorber in the fusing agent can vary depending on the type of radiation absorber. In some examples, an amount of radiation absorber in the fusing agent can be from about 0.1 wt % to about 10 wt %. In another example, the amount can be from about 0.5 wt % to about 7.5 wt %. In yet another example, the amount can be from about 1 wt % to about 10 wt %. In a particular example, the amount can be from about 0.5 wt % to about 5 wt %.

Example radiation absorbers can include carbon black, a metal dithiolene complex, a near-infrared absorbing dye, a near-infrared absorbing pigment, metal nanoparticles, a conjugated polymer, or a combination thereof. In an example, the radiation absorber can be carbon black. In some examples, the radiation absorber can be colored or colorless.

Examples of near-infrared absorbing dyes can include aminium dyes, tetraaryldiamine dyes, cyanine dyes, pthalocyanine dyes, dithiolene dyes, and others. A variety of near-infrared absorbing pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2. For example, $M_2P_2O_7$ can include compounds such as $Cu_2P_2O_7$, $Cu/MgP_2O_7$, $Cu/ZnP_2O_7$, or any other suitable combination of counterions. The phosphates described herein are not limited to counterions having a +2 oxidation state. Other phosphate counterions can also be used to prepare other suitable near-infrared pigments. Additional near-infrared absorbing pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. The silicates described herein are not limited to counterions having a +2 oxidation state. Other silicate counterions can also be used to prepare other suitable near-infrared pigments.

In further detail, depending on how much fusing agent is used, various build layers or portions of individual build layers can be made to have different levels of elasticity and/or softness compared to other layers or other portions of individual layers, for example. Thus, custom stacks of layers within a part can be prepared with modulated or varying degrees of mechanical properties, e.g., hardness, stress at yield, Young's modulus, tensile strength, etc. As an example, by reducing the hardness of a three-dimensional object, or a portion of a three-dimensional object, the objects can be made to be potentially tougher with respect to breakage from stretching and/or shearing, even if they are lower in hardness.

When applying the fusing agent to the polymeric build material, the concentration of the lower alkyldiol organic co-solvent in the fusing agent can be considered in conjunction with the concentration of the radiation absorber. These concentrations can be used to determine how much fusing agent to apply to achieve a weight ratio of fusing agent to polymeric build material and weight ratio of lower alkyldiol organic co-solvent to polymeric build material to provide for acceptable layer-by-layer fusing and softening, respectively. For example, the fusing agent, as mentioned, can include from about 0.1 wt % to about 10 wt % radiation absorber in some examples, and can also include from about 5 wt % to about 40 wt % lower alkyldiol organic co-solvent. Thus, if applying the fusing agent (10 wt %) to the polymeric build material (90 wt %) at about a 1:9 weight ratio, then the radiation absorber to polymeric build material weight ratio (as applied) can be from about 1:10000 to about 1:100, and the lower alkyldiol organic co-solvent to polymeric build material weight ratio (as applied) can be from about 1:180 to about 2:45, for example. If more (up to 20 wt %) or less (down to 5 wt %) fusing agent is applied to the polymeric build material, then these ratios can be expanded accordingly. That stated, the weight ratio of the radiation absorber to the polymeric build material (as applied) in some more specific examples can be from about 1:1000 to about 1:80, from about 1:800 to about 1:100, or from about 1:500 to about 1:150, for example. The weight ratio of the lower alkyldiol organic co-solvent to polymeric build material (as applied) can, in some more specific examples, be from about 1:150 to about 1:25, about 1:125 to about 1:30, or about 1:100 to about 1:40, for example.

In some examples, in addition to the radiation absorber and the lower alkyldiol organic co-solvent, there may be other components or dispersed additives therein. Thus, an "aqueous liquid vehicle" may include the water, the alkyldiol organic co-solvent, and/or other liquid components, e.g., other organic co-solvents, surfactant, etc. For example, the aqueous liquid vehicle can further include from about 0.01 wt % to about 2 wt % or from about 0.01 wt % to about 0.5 wt % surfactant. In other examples, the fusing agent can further include a dispersant. Dispersants can help disperse the radiation absorber or other particulate additives. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctyl-phenyl ether, sodium polyacrylate, and combinations thereof. Other additives may be present as part of the aqueous liquid vehicle, as described more fully below.

Detailing Agents

In some examples, the three-dimensional printing kits, methods of printing a three-dimensional object, and/or three-dimensional printing systems can further include a detailing agent and/or the application thereof. A detailing agent can include a detailing compound capable of cooling the polymeric build material upon application. In some examples, the detailing agent can be printed around the edges of the portion of a polymeric build material that is or can be printed with the fusing agent. The detailing agent can increase selectivity between the fused and un-fused portions of the polymeric build material by reducing the temperature of the polymeric build material around the edge of the portion to be fused. In other examples, the detailing agent can be printed in areas where the fusing agent is printed to provide additional cooling when printing a three-dimensional object.

In some examples, the detailing agent can be a solvent that can evaporate at the temperature of the particulate build material supported on the powder bed or build platform. As mentioned above, in some cases, the polymeric build material in the powder bed can be preheated to a preheat temperature within about 10° C. to about 70° C. of the fusing temperature of the polymeric build material. Thus, the detailing agent can be a solvent that evaporates upon contact with the polymeric build material at the preheat temperature, thereby cooling the printed portion through evaporative cooling. In certain examples, the detailing agent can include water, co-solvents, or combinations thereof. In further examples, the detailing agent can be substantially devoid of radiation absorbers. That is, in some examples, the detailing agent can be substantially devoid of ingredients that absorb enough energy from the energy source to cause the polymeric build material to fuse. In certain examples, the detailing agent can include colorants such as dyes or pigments, but in small enough amounts such that the colorants do not cause the polymeric build material printed with the detailing agent to fuse when exposed to the energy source.

Aqueous Liquid Vehicles

As used herein, the term "aqueous liquid vehicle" may refer to the liquid in the fusing agent, the detailing agent, and/or other fluid agents that may be present. The aqueous liquid vehicle may include water alone or in combination with a variety of additional components. With respect to the fusing agent, the aqueous liquid vehicle includes water and organic co-solvent (including the lower alkyldiol organic co-solvent), but with respect to the detailing agent, the aqueous liquid vehicle may be water, or may include water and organic co-solvent, for example. Either or both may or may not include surfactant, for example. Furthermore, in some three-dimensional printing kits, methods, and systems, the detailing agent (or any other fluid agent) may or may not be included altogether. Examples of components that may be included in the aqueous liquid vehicle, in addition to water, may include organic co-solvent, surfactant, buffer, antimicrobial agent, anti-kogation agent, chelating agent, buffer, etc. In an example, the aqueous liquid vehicle can include water and organic co-solvent. In another example, the aqueous liquid vehicle can include water, organic co-solvent, and a surfactant. In yet another example, the aqueous liquid vehicle can include water, organic co-solvent, surfactant, and buffer (or buffer and a chelating agent).

In examples herein, the aqueous liquid vehicle for the fusing agent, the detailing agent, or any other fluid agent included in the kits, methods, and/or systems herein, can include from about 25 wt % to about 90 wt % or from about 30 wt % to about 75 wt % water, and can also include from about from about 5 wt % to about 60 wt % or from about 10 wt % to about 50 wt % organic co-solvent. These weight percentages are based on the fluid agent as a whole, and not just the liquid vehicle component. Thus, the liquid vehicle can include water that may be deionized, for example. In an example, the aqueous liquid vehicle can include organic-solvent to water at a ratio from about 2:1 to about 1:2, from about 1:1 to about 1:2, from about 1:1 to about 1:1.5 or from about 1:1 to about 1:1.25. In some examples, such as with respect to the detailing agent, the aqueous liquid vehicle may carry no solids, may be simply water, or may include as major components a combination of water and organic co-solvent.

The aqueous liquid vehicle in any of these fluid agents may include organic co-solvent(s). Some examples of co-solvent that may be added to the vehicle include 1-(2-hydroxyethyl)-2-pyrollidinone, 2-pyrrolidinone, 2-methyl-1,3-propanediol, 1,5-pentanediol, triethylene glycol, tetraethylene glycol, 1,6-hexanediol, tripropylene glycol methyl ether, ethoxylated glycerol-1 (LEG-1), or a combination thereof. In one example, the co-solvent can include 2-pyrrolidonone. Whether a single co-solvent is used or a combination of co-solvents is used, the total amount of co-solvent(s) in the fusing agent, the detailing agent, or other fluid agent can be from about 5 wt % to about 60 wt %, from about 10 wt % to about 50 wt %, from about 15 wt % to about 45 wt %, or from about 30 wt % to about 50 wt % based on a total weight percentage of the fusing agent or the total weight percentage of the detailing agent.

The aqueous liquid vehicle may also include surfactant. The surfactant can include non-ionic surfactant, cationic surfactant, and/or anionic surfactant. In one example, the fusing agent includes an anionic surfactant. In another example, the fusing agent includes a non-ionic surfactant. In still another example, the fusing agent includes a blend of both anionic and non-ionic surfactant. Example non-ionic surfactant that can be used includes self-emulsifiable, non-ionic wetting agent based on acetylenic diol chemistry (e.g., SURFYNOL® SEF from Air Products and Chemicals, Inc., USA), a fluorosurfactant (e.g., CAPSTONE® fluorosurfactants from DuPont, USA), or a combination thereof. In other examples, the surfactant can be an ethoxylated low-foam wetting agent (e.g., SURFYNOL® 440, SURFYNOL® 465, or SURFYNOL® CT-111 from Air Products and Chemical Inc., USA) or an ethoxylated wetting agent and molecular defoamer (e.g., SURFYNOL® 420 from Air Products and Chemical Inc., USA). Still other surfactants can include wetting agents and molecular defoamers (e.g., SURFYNOL® 104E from Air Products and Chemical Inc., USA), alkylphenylethoxylates, solvent-free surfactant blends (e.g., SURFYNOL® CT-211 from Air Products and Chemicals, Inc., USA), water-soluble surfactant (e.g., TERGITOL® TMN-6, TERGITOL® 15S7, and TERGITOL® 15S9 from The Dow Chemical Company, USA), or a combination thereof. In other examples, the surfactant can include a non-ionic organic surfactant (e.g., TECO® Wet 510 from Evonik Industries AG, Germany), a non-ionic a secondary alcohol ethoxylate (e.g., TERGITOL® 15-S-5, TERGITOL® 15-S-7, TERGITOL® 15-S-9, and TERGITOL® 15-S-30 all from Dow Chemical Company, USA), or a combination thereof. Example anionic surfactant can include alkyldiphenyloxide disulfonate (e.g., DOWFAX® 8390 and DOWFAX® 2A1 from The Dow Chemical Company, USA), oleth-3 phosphate surfactant (e.g., CRODAFOS™ N3 Acid from Croda, UK). Example cationic surfactant that can be used includes dodecyltrimethylammonium chloride, hexadecyldimethylammonium chloride, or a combination thereof. In some examples, the surfactant (which may be a blend of multiple surfactants) may be present in the fusing agent, the detailing agent, or other fluid agent at an amount ranging from about 0.01 wt % to about 2 wt %, from about 0.05 wt % to about 1.5 wt %, or from about 0.01 wt % to about 1 wt %.

In some examples, the liquid vehicle may also include a chelating agent, an antimicrobial agent, a buffer, or a combination thereof. While the amount of these may vary, if present, these can be present in the fusing agent, the detailing agent, or other fluid agent at an amount ranging from about 0.001 wt % to about 20 wt %, from about 0.05 wt % to about 10 wt %, or from about 0.1 wt % to about 5 wt %.

The liquid vehicle may include a chelating agent. Chelating agent(s) can be used to minimize or to eliminate the deleterious effects of heavy metal impurities. Examples of suitable chelating agents can include disodium ethylenediaminetetraacetic acid (EDTA-Na), ethylene diamine tetra acetic acid (EDTA), and methyl-glycinediacetic acid (e.g., TRILON® M from BASF Corp., Germany). If included, whether a single chelating agent is used or a combination of chelating agents is used, the total amount of chelating agent(s) in the fusing agent, the detailing agent, or other fluid agent may range from 0.01 wt % to about 2 wt % or from about 0.01 wt % to about 0.5 wt %.

The liquid vehicle may also include antimicrobial agents. Antimicrobial agents can include biocides and fungicides. Example antimicrobial agents can include the NUOSEPT®, Ashland Inc. (USA), VANCIDE® (R. T. Vanderbilt Co., USA), ACTICIDE® B20 and ACTICIDE® M20 (Thor Chemicals, U. K.), PROXEL® GXL (Arch Chemicals, Inc., USA), BARDAC® 2250, 2280, BARQUAT® 50-65B, and CARBOQUAT® 250-T, (Lonza Ltd. Corp., Switzerland), KORDEK® MLX (The Dow Chemical Co., USA), and combinations thereof. In an example, if included, the total amount of antimicrobial agents in the fusing agent, the detailing agent, or other fluid agent can range from about 0.01 wt % to about 1 wt %.

In some examples, the liquid vehicle may further include buffer solution(s). In some examples, the buffer solution(s) can withstand small changes (e.g., less than 1) in pH when small quantities of a water-soluble acid or a water-soluble base are added to a composition containing the buffer solution(s). The buffer solution(s) can have pH ranges from about 5 to about 9.5, or from about 7 to about 9, or from about 7.5 to about 8.5. In some examples, the buffer solution(s) can include a poly-hydroxy functional amine. In other examples, the buffer solution(s) can include potassium hydroxide, 2-[4-(2-hydroxyethyl) piperazin-1-yl] ethane sulfonic acid, 2-amino-2-(hydroxymethyl)-1,3-propanediol (TRIZMA® sold by Sigma-Aldrich, USA), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof. In yet other examples, the buffer solution(s) can include 2-amino-2-(hydroxymethyl)-1,3-propanediol (TRIZMA® sold by Sigma-Aldrich, USA), beta-alanine, betaine, or mixtures thereof. The buffer solution, if included, can be added in the fusing agent, the detailing agent, or other fluid agent at an amount ranging from about 0.01 wt % to about 10 wt %, from about 0.1 wt % to about 7.5 wt %, from about 0.05 wt % to about 5 wt %.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "kit" can be synonymous with and understood to include a plurality of multiple components where the different components can be separately contained (though in some instances co-packaged in separate containers) prior to use, but these components can be combined together during use, such as during the three-dimensional object build processes described herein. The containers can be any type of a vessel, box, or receptacle made of any material.

As used herein, "dispensing" when referring to fusing agents that may be used, for example, refers to any technology that can be used to put or place the fluid, e.g., fusing agent, on the polymeric build material or into a layer of polymeric build material for forming a green body object. For example, "applying" may refer to "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture. Additionally, such architecture can be configured to print varying drop sizes such as up to about 20 picoliters (pL), up to about 30 pL, or up to about 50 pL, etc. Example ranges may include from about 2 pL to about 50 pL, or from about 3 pL to about 12 pL.

As used herein, a plurality of items, structural elements, compositional elements, and/or materials may be presented in a common list for convenience. However, these lists should be construed as though the individual member of the list is identified as a separate and unique member. Thus, no individual member of such list should be construed as a de facto equivalent of any other member of the same list based on presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. Numerous modifications and alternative compositions, methods, and systems may be devised without departing from the present disclosure. The appended claims are intended to cover such modifications and arrangements.

Example 1—Preparation of a Fusing Agents

An example fusing agent (FA-1) and a control fusing agent (FA-C) were prepared by admixing the components set forth in Table 1 together. As a note, the example fusing agent (FA-1) included 1,5-pentanediol as the organic co-solvent component, which also provides attributes of a plasticizer for soft segments of thermoplastic build material. Instead of the alkyl diol used in FA-1, the control fusing agent (FA-C) included 2-pyrrolidone and triethylene glycol as the organic co-solvent component.

TABLE 1

Example Fusing Agent and Control Fusing Agent

| Component | FA-1 (wt %) | FA-C (wt %) |
| --- | --- | --- |
| Organic Co-solvent (1,5-Pentanediol) | 20 | — |
| Organic Co-solvent (2-Pyrrolidone, Triethylene Glycol) | — | 27 |
| Surfactant/Emulsifier | 1.2 | 1.1 |
| Chelator | 0.08 | 0.08 |
| Biocide | 0.32 | 0.32 |
| Radiation Absorber (Carbon Black Pigment) | 5 | 5 |
| DI Water | Balance | Balance |
| pH | 9-9.3 | 9-9.5 |

Example 2—Preparation of Three-Dimensional Objects for Comparison

Several three-dimensional printed objects were prepared in the shape of dog bones (or barbells) using the two fusing agents of Table 1 (FA-1 and FA-C) printed layer-by-layer into a block copolymer elastomeric powder as the polymeric build material, namely thermoplastic polyamide (TPA) having a D50 particle size of about 50 µm to about 80 µm. Notably, the TPA selected for use in this study included polyol blocks as part of the soft-segment of the polymer of the polymeric build material. More specifically, the dog bones were printed using Multi-jet Fusion (MJF) printers under common printing conditions, with a printing bed temperature of about 130° C., heat fusion using a common infrared lamp turned on and off to control heating, a printer speed of about 25 inches per second, and allowing for multiple passes per layer. Using this process, four (4) example dog bones were prepared using the example fusing agent (FA-1) and four (4) control dog bones were prepared using the control fusing agent (FA-C). All of the dog bones formed were "Type 5" (ASTM D638) dog bones, with an elongated middle section flanked by two enlarged end portions.

Example 3—Evaluation of Mechanical Properties

The dog bones prepared in accordance with Example 2 were evaluated for mechanical properties and averaged over the 4 dog bones for both types prepared, namely Dog Bones 1-4 prepared with example fusing agent FA-1 and Dog Bones 5-8 prepared with control fusing agent FA-C. Each sample prepared included multiple fused layers which were printed at about a 100 µm thickness, and the Stress at Yield, Young's Modulus, and Strain (or elongation) at break, and were measured using a tensile test following a standard procedure as described in ASTM D638. Before carrying out the tensile testing protocol, all samples were pre-conditioned at 23° C. and 50% relative humidity for at least 24 hours after being built. In the tensile test, a pull speed of 10 mm/min was applied and an extensometer was used to gauge the true strain of samples within the gauge length. The data collected for the eight dog bones, and the average values for the control dog bones and the example dog bones is provided in Table 2, as follows:

TABLE 2

Mechanical Properties

| Sample ID | Fusing Agent ID | Stress at Yield (MPa) | Young's Modulus (MPa) | Strain at Break (%) |
| --- | --- | --- | --- | --- |
| Dog Bone 1 | FA-1 | 9.87 | 93.13 | 299.29 |
| Dog Bone 2 | FA-1 | 11.08 | 79.61 | 349.94 |
| Dog Bone 3 | FA-1 | 10.45 | 83.63 | 289.58 |
| Dog Bone 4 | FA-1 | 11.07 | 70.95 | 397.42 |
| Average 1-4 | FA-1 | ~10.62 | ~81.83 | ~334.06 |
| Dog Bone 5 | FA-C | 7.44 | 123.71 | 84.8 |
| Dog Bone 6 | FA-C | 8.85 | 82.56 | 183.88 |
| Dog Bone 7 | FA-C | 7.76 | 73.57 | 125.6 |
| Dog Bone 8 | FA-C | 9.05 | 73.86 | 196.86 |
| Average 5-8 | FA-C | ~8.28 | ~88.43 | ~147.79 |

As can be seen in Table 2, in some categories, the dog bone mechanical property values are relatively comparable. For example, the stress at yield was around 10.62 (on average) and the Young's modulus was about 81.83 (on average) when using FA-1 as the fusing agent. Similarly, the stress at yield was around 8.28 (on average) and the Young's modulus was about 88.43 (on average) when using FA-C as the fusing agent. However, more interestingly, the strain (elongation) at break for the dog bones prepared using the example fusing agent (FA-1) was approximately 334%. In other words, the dog bones could be elongated more than three times (on average) their printed length before the dog bones finally broke in two pieces. On the other hand, the dog bones prepared using the control fusing agent (FA-C) had an elongation at break of only about 148%, which is more than a two-factor inferior performance difference, on average, compared to the elongation at break for dog bones prepared using FA-1.

What is claimed is:

1. A three-dimensional printing kit, consisting of:
a polymeric build material consisting of thermoplastic elastomeric particles having a D50 particle size ranging from about 2 µm to about 150 µm, wherein the thermoplastic elastomeric particles are selected from the group consisting of thermoplastic elastomeric polyamide particles, thermoplastic elastomeric polyester particles, copolymers thereof, and mixtures thereof, and wherein the thermoplastic elastomeric particles include block copolymers with a polyol soft-segment block; and
a fusing agent including water, from about 5 wt % to about 40 wt % of a lower alkyldiol organic co-solvent, and a radiation absorber to generate heat from absorbed electromagnetic radiation.

2. The three-dimensional printing kit of claim 1, wherein the lower alkyldiol organic co-solvent is a C2 to C8 alkyldiol with two hydroxyl groups.

3. The three-dimensional printing kit of claim 1, wherein the lower alkyldiol organic co-solvent is a C4 to C6 straight-chained alkyldiol with two terminal hydroxyl groups.

4. The three-dimensional printing kit of claim 1, wherein the radiation absorber is present in the fusing agent in an amount ranging from about 0.1 wt % to about 10 wt % and is selected from the group consisting of carbon black, a metal dithiolene complex, a near-infrared absorbing dye, a near-infrared absorbing pigment, metal nanoparticles, a conjugated polymer, and a combination thereof.

5. The three-dimensional printing kit of claim 1, wherein the fusing agent is devoid of lactam organic co-solvents.

6. A method of printing a three-dimensional object utilizing the three-dimensional printing kit of claim 1, the method comprising:
- iteratively applying individual polymeric build material layers consisting of the thermoplastic elastomeric particles;
- based on a three-dimensional object model, iteratively and selectively dispensing the fusing agent onto the individual polymeric build material layers; and
- iteratively exposing the individual polymeric build material layers with the fusing agent dispensed thereon to electromagnetic radiation to selectively fuse the thermoplastic elastomeric particles of the polymeric build material in contact with the radiation absorber of the fusing agent and to form a fused three-dimensional object.

7. The method of claim 6, wherein the lower alkyldiol organic co-solvent of the fusing agent is a C2 to C8 alkyldiol with two hydroxyl groups.

8. The method of claim 6, wherein the lower alkyldiol organic co-solvent of the fusing agent is applied to the individual polymeric build material layers at a lower alkyldiol organic co-solvent to polymeric build material weight ratio from about 1:180 to about 2:45.

9. A three-dimensional printing system utilizing the three-dimensional printing kit of claim 1, the three-dimensional printing system comprising:
- a build material supply containing the polymeric build material; and
- a fluid applicator fluidly coupled or coupleable to the fusing agent and for iteratively applying the fusing agent.

10. The three-dimensional printing system of claim 9, further comprising an electromagnetic radiation source positioned to provide electromagnetic radiation to the layers of the polymeric build material having the fusing agent applied thereto.

11. The three-dimensional printing system of claim 9, wherein the lower alkyldiol organic co-solvent of the fusing agent is a C2 to C8 alkyldiol with two hydroxyl groups.

12. The three-dimensional printing kit of claim 1, wherein the thermoplastic elastomeric particles have a D50 particle size ranging from about 125 μm to about 150 μm.

13. The three-dimensional printing kit of 1, wherein the fusing agent has a pH ranging from 9 to 9.3.

14. The three-dimensional printing kit of claim 1, wherein the fusing agent consists of the water, the lower alkyldiol organic co-solvent, and the radiation absorber.

15. The three-dimensional printing system of claim 9, further comprising:
- an electromagnetic radiation source; and
- a three-dimensional object model, executable by a controller, to:
  - utilize the build material supply and the fluid applicator to iteratively form at least one layer of the polymeric build material; and
  - utilize the electromagnetic radiation source to apply energy to the at least one layer to form a three-dimensional object.

16. A three-dimensional printing kit, comprising:
- a polymeric build material consisting of particles of a thermoplastic elastomeric polyamide block copolymer with polyol blocks, the particles having a D50 particle size ranging from about 50 μm to about 80 μm; and
- a fusing agent including water, 20 wt % of 1,5-pentanediol, and a radiation absorber to generate heat from absorbed electromagnetic radiation.

17. The three-dimensional printing kit of claim 16, wherein the polymeric build material is free of a plasticizer.

18. The three-dimensional printing kit of claim 1, wherein the fusing agent is devoid of a lactam organic co-solvent.

* * * * *